MANUFACTURE OF MAGNETIC RECORDS

Filed Oct. 5, 1959 3 Sheets-Sheet 1

Feb. 16, 1965 J. GROAK 3,170,044

MANUFACTURE OF MAGNETIC RECORDS

Filed Oct. 5, 1959 3 Sheets-Sheet 3

United States Patent Office 3,170,044

Patented Feb. 16, 1965

3,170,044

MANUFACTURE OF MAGNETIC RECORDS

Josef Groak, Ashley Cottage, 32 Ashley Lane, London NW. 4, England

Filed Oct. 5, 1959, Ser. No. 844,493
Claims priority, application Great Britain, Oct. 15, 1958, 32,969/58
12 Claims. (Cl. 179—100.2)

The present invention relates to the production of magnetic records, that is records in which information is recorded as a magnetised track on a flexible sheet of magnetisable material. The invention is concerned with records of the type having a number of parallel tracks and records in the form of a sleeve having a helical track, which may be regarded as a number of parallel tracks. The recorded information may be recorded sound such as speech or music, but is not necessarily such.

It is an object of the invention to provide an improved method whereby a large number of records can be produced from a master record in a relatively short time.

According to the invention there is provided a method of manufacturing a magnetic record wherein a plurality of sections of a master record are scanned together in one movement by a corresponding plurality of reproducing heads, and the outputs of the reproducing heads are applied to a corresponding plurality of recording heads co-operating with a magnetic recording medium, there being relative motion between the recording heads and the magnetic recording medium whereby a record is produced in which information is recorded along a plurality of parallel tracks.

The invention also relates to apparatus for carrying out the method.

The recording medium may be either an open-ended sheet or a sleeve. An open-ended sheet may be joined to form a sleeve and in particular may be joined with a staggered joint so that tracks recorded parallel to the edges of the sheet join to form a helical track.

The method may be carried out conveniently when the recording medium is an open-ended sheet by placing the sheet on a flat bed, pins or other means being provided to effect registration, and moving the recording heads over the sheet in a carriage. With this arrangement feeding mechanism such as that employed in the printing industry may be employed to feed sheets of recording medium on to the bed between successive recording traverses of the carriage. This enables the method to be carried out automatically at high speed.

The master record is preferably likewise either an open-ended sheet or a sleeve with parallel tracks thereon but may consist of a number of lengths of magnetic tape fed past the individual recording heads at the same time. In the latter case however problems of synchronism are greater.

For scanning the tracks of the master record either the record or the reproducing heads may be moved. Similarly either the recording medium or the recording heads may be moved.

The two pluralities of heads are preferably in the form of two multitrack heads. For closely spaced tracks it may be necessary to stagger adjacent heads. It will be appreciated that individual amplifiers can be provided in the channels connecting the recording heads to the reproducing heads.

Figures 1, 2, 3:
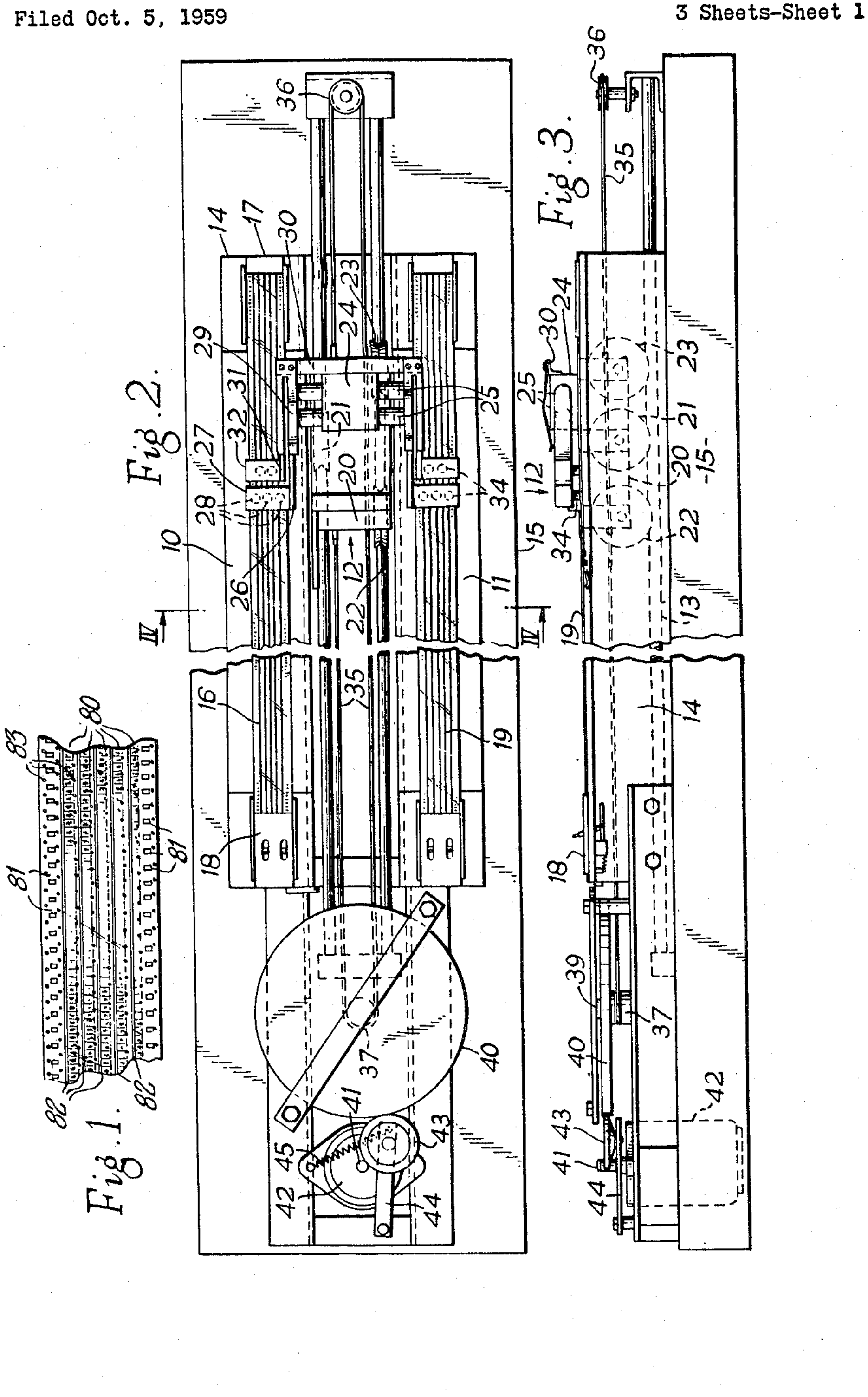
Figure 4:
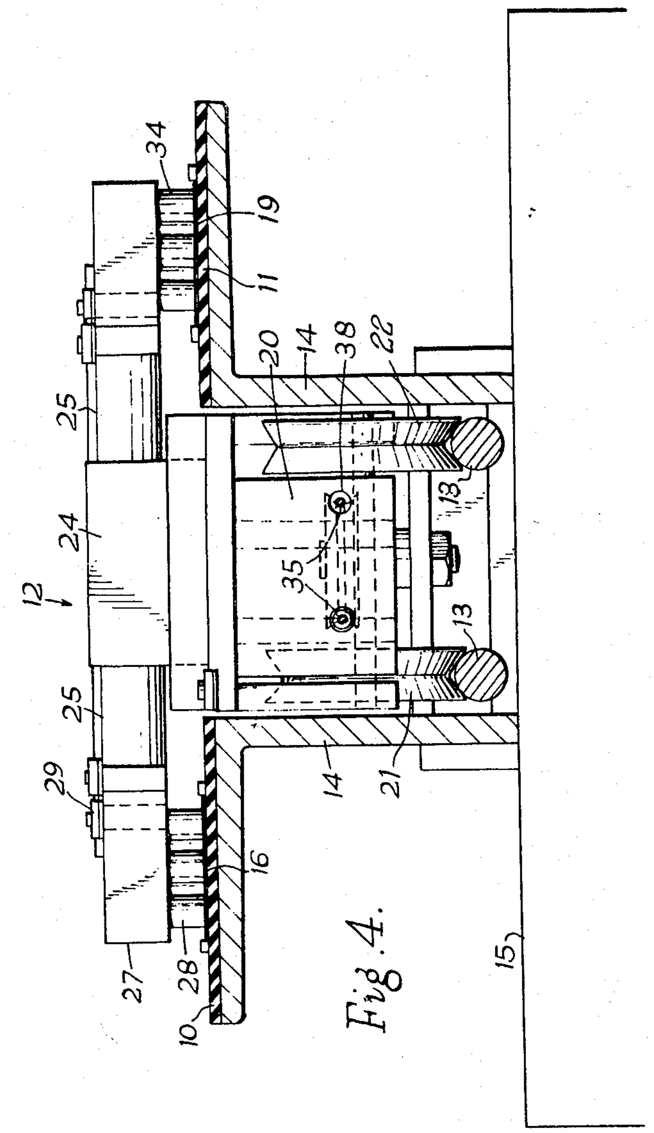
Figure 5:
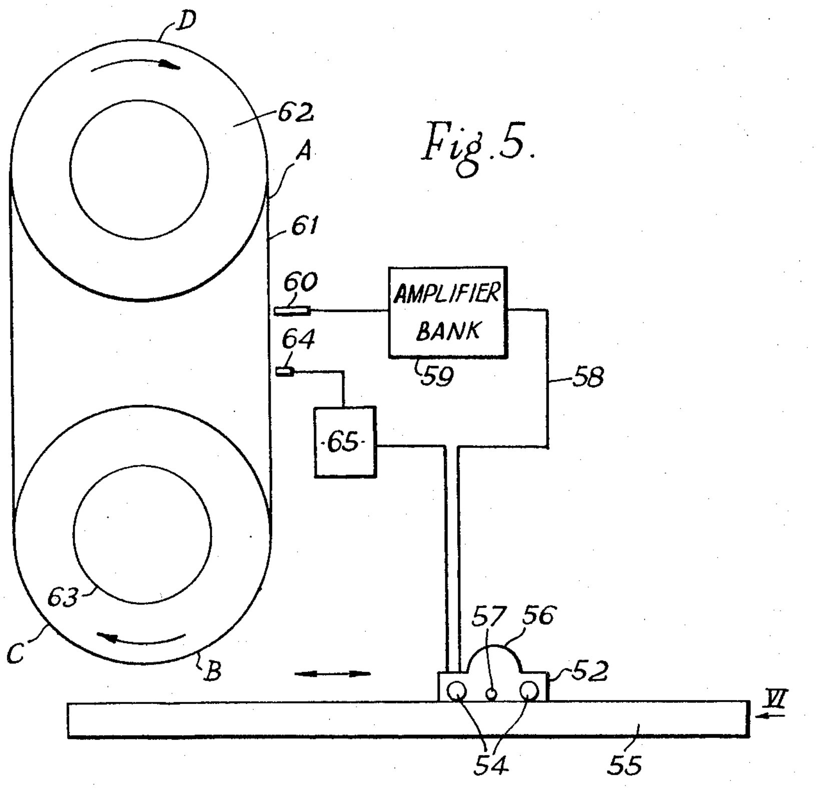
Figures 6, 7:
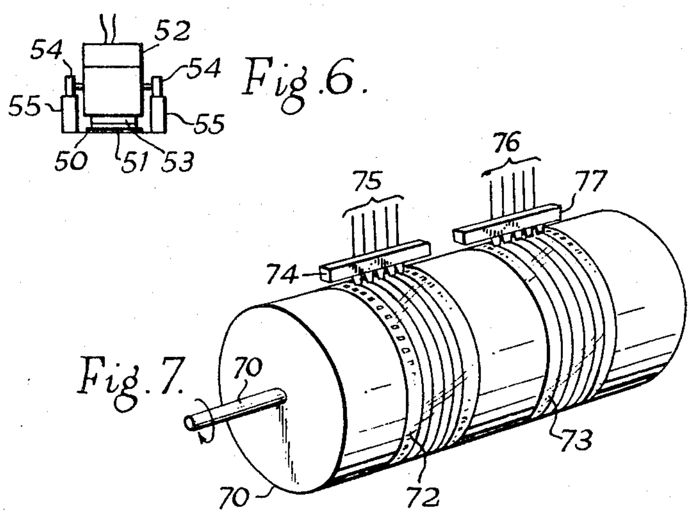

The invention will now be described by way of example with reference to the accompanying drawings in which:

FIG. 1 shows part of a magnetic record such as may be reproduced by the method of the invention, FIG. 2 is a plan view of one embodiment of the invention, FIG. 3 is a side elevation of the apparatus shown in FIG. 2, FIG. 4 is a section on the line IV—IV of FIG. 2, FIG. 5 is a schematic view of a second embodiment of the invention, FIG. 6 is a view in the direction of the arrow VI in FIG. 5, and FIG. 7 is a sketch illustrating a third embodiment of the invention.

The apparatus shown in FIGS. 2 to 4 comprises two angle irons 14 fixed to a main bed 15. One flange of each angle iron is vertical and parallel to the vertical flange of the other angle iron, a channel for a carriage 12 being formed between the vertical flanges. Parallel rails 13 lie at the bottom of the channel. The other flanges of the angle irons are horizontal and extend outwardly of the channel, being covered with sheets 10 and 11 of non-magnetic material forming beds for strips of film material. A master strip 16 (such as is shown in FIG. 1 for example) is fixed to the bed 10, being held by a clamping plate 17 at one end and by strip-tensioning means 18 at the other end. The master strip 16 bears five parallel recorded tracks of magnetic material and it is required to reproduce the record by recording on to a strip of film 19 held on the bed 11. This is effected by way of the carriage 12.

The carriage has a main frame 20 in which are journalled the spindles of three grooved wheels 21, 22 and 23. The wheel 21 is on one side of the carriage and runs on one rail 13, the wheels 22 and 23 being in alignment on the other side of the carriage and running on the other rail 13.

A block 24 is fixed on top of the main frame 12 and on each side of the block there are two transversely projecting arms 25. Only the structure borne by the arms 25 on the master strip side of the carriage will be described in detail as the structure on the other side is exactly complementary.

One arm 25 bears an arm 26 extending lengthwise of the bed and capable of pivotal up and down movement. On the free end of the arm 26 is a brass block 27 which extends over the width of the master strip 16 and has three magnetic reproducing heads 28 aligned respectively with the two outer ones and the middle one of the five tracks on the strip 16. A light spring 29 supported on a bracket 30 fixed to the block 24 bears on the arm 26 and hence holds the heads 28 against the strip 16. In like way an arm 31 on the other rod 25 bears a block 32 having heads 33 aligned with the other two tracks on the strip 16. The staggering of the three heads 28 with respect to the two heads 33 is done in order to be able to align heads with each of the closely spaced tracks on the strip 16.

Flexible wires (not shown) are taken from the heads 28 and 33 to a bank of five amplifiers (not shown) which supply signals, again through flexible wires to five recording heads 34 aligned with five tracks of magnetic recording material on the strip 19.

As the carriage 12 is moved along the rails 13 signals are picked up simultaneously from the five tracks of the master strip 16, are amplified and are recorded simultaneously on the five tracks of the strip 19. Thus a replica of the master strip is made. Since all heads move on the same carriage absolute synchronism is achieved, the staggering of the heads being immaterial so far as this is concerned.

The carriage is driven backwards and forwards by means of a cord 35, which having both ends fixed to the main frame 20 of the carriage 12, forms an endless loop. One end of the loop passes round a freely rotatable pulley 36 and the other round a driven pulley 37, the run between passing through an aperture 38 in the frame 20.

The pulley 37 is fixed to a shaft 39 which also bears a flywheel 40. Drive is imparted to the flywheel by a capstan 41 driven by a motor 42 through an idler 43 mounted on a swinging arm 44 and biased by a spring 45 between the capstan 41 and the edge of the flywheel 40.

The bed for supporting the recording material may be provided with associated feed mechanism for feeding sheets of material on to the bed and removing recorded sheets therefrom. Automatic operation of this mechanism and the carriage can be controlled by means of micro-switches engaged by the carriage at the end of each traverse. Thus it is arranged that there is a dwell period of the carriage at the end of each traverse during which the feed mechanism operates. A record is made during all traverses in either direction.

Alternatively there may be substantially no dwell period, recording being effected only during traverses in one direction and the feed mechanism operating during the return traverses, which may be more rapid than the recording traverses.

Whilst it is more convenient to move the heads on a carriage it will be appreciated that it is possible to move the two beds past fixed heads. Furthermore, the beds need not be flat, but may be cylindrical for instance the heads then being moved round the cylinder on the cylinder being rotated past the heads. Of course the relative motion can also be compounded of motion of both the heads and the cylinder.

One arrangement is shown in FIG. 7 and comprises a drum 70 mounted on a spindle 71 and, in operation, driven round slowly on that spindle. The drum is encircled by a master record 72 and a strip of recording material 73. A set 74 of reproducing heads co-operate with five tracks on the record 72 and leads 75 go from the reproducing heads to amplifiers (not shown). Leads 76 from the amplifiers go to a set of recording heads 77 co-operating with five tracks on the strip 73.

The apparatus shown FIGS. 5 and 6 comprises one flat bed 50 with associated feed mechanism (not shown) for the recording material 51. A carriage 52 with recording heads 53 has wheels 54 running on rails 55 over this bed and is driven along the rails by means of a synchronous electric motor 56 operating a precision capstan 57 against one of the rails 55.

The recording heads 53 are connected by a flexible cable 58 through amplifiers 59 to a set of fixed reproducing heads 60. The master record is in the form of a sleeve 61 driven round on two drums 62 continuously past the reproducing heads by a synchronous motor 63. The sleeve consists of two sections bearing tracks joined by two spacing sections. One track bearing section between A and B in FIG. 5 is utilised to provide signals for recording during traverses of the carriage in one direction. The tracks on the other track bearing section (between C and D) run in the opposite direction and are utilised to provide signals for recording during traverses of the carriage in the other direction. The feed mechanism operates whilst the spacing section (between B and C and D and A) pass the reproducing heads 60.

The carriage motor 56, which should be of high starting torque, and the feed mechanism are controlled by signals derived from the master record. This may be done by stops on the record actuating trips, photoelectrically or, as shown, by means of a separate magnetic track and a head 64. This track may either give only cueing signals by way of a motor control 65 or also provide a signal which after amplification is used to supply the synchronous carriage motor.

Whilst cueing signals do not lock the motion of the carriage to that of the master record they give adequate results if the carriage has only to travel backwards and forwards say three feet. A convenient size of film record need only be of tthis length.

It will be appreciated that more than one carriage with its set of heads can be controlled from the one master loop and hence high rates of production can be achieved. Likewise, in the apparatus first described, the carriage may carry several sets of recording heads coupled to the one set of reproducing heads.

The recording material can be coated overall with magnetic material for producing long-playing sound records. The material may also be film-base material coated only along strips with spaces between for lines of pictures, as shown in FIG. 1. Here 35 mm. film is provided with five tracks 80 of pictures between the customary sprocket punchings 81. Interleaved with the five tracks 80 are five magnetic tracks 82. The strip is also provided with a pattern of punchings 83 used in driving the film in reproducing apparatus by means of pinned rollers. Furthermore the material may be opaque film-base material, pictures for reproduction by means of reflected light being printed on one side and the other side coated with magnetic material on which an associated sound track is recorded.

I claim:

1. Apparatus for rapidly making a duplicate of a magnetic record having a continuous record of information divided into a plurality of parallel arranged component tracks presenting said information in sequence through said tracks comprising scanning means for scanning said tracks simultaneously, said scanning means comprising a plurality of transducer heads cooperating with said component tracks respectively, a second like plurality of transducer heads, coupling means for applying signals developed by the first said transducer heads to the second said transducer heads respectively and means for moving said second transducer heads and magnetic recording medium relative to one another so that said second transducer heads lay down parallel magnetic tracks corresponding to and duplicating said component tracks of the first said magnetic record respectively.

2. A method of rapidly duplicating a magnetic record of information comprising the steps of: providing an endless loop of material having a plurality of helically parallel tracks of information recorded thereon, the end of each track being jonied to the beginning of a successive track to form a continuous helical track of information on said loop; scanning each of said tracks with a like plurality of scanning means; and recording a like plurality of helically parallel tracks on a second endless loop.

3. A method of rapidly duplicating a magnetic record of information comprising the steps of: providing an endless loop having information recorded thereon in a continuous helical track; cutting said endless loop transversely forming a flat sheet having said single helical track now divided into a plurality of parallel tracks; scanning said information on each of said parallel tracks; and recording said scanned information in a like plurality of parallel tracks on a second flat sheet.

4. A method of rapidly duplicating a magnetic record of information comprising the steps of: providing an endless loop having information recorded thereon in a continuous helical track; cutting said endless loop transversely forming a flat sheet having said single helical track now divided into a plurality of parallel tracks; scanning said information on each of said parallel tracks; recording said scanned information in a like plurality of parallel tracks on a second flat sheet; and joining the ends of said second flat sheet to form a second endless loop having said parallel tracks matched to form a continuous helical track of recorded information.

5. A method of rapidly duplicating a magnetic record of information comprising the steps of: providing an endless loop having information recorded thereon in a continuous helical track; cutting said endless loop transversely forming a flat sheet having said single helical track now divided into a plurality of parallel tracks; scanning said information on each of said parallel tracks at substantially the same time; and recording said scanned information in a like plurality of parallel tracks on a second flat sheet.

6. A method of rapidly duplicating a magnetic record of information comprising the steps of: providing an endless loop having information recorded thereon in a continuous helical track; cutting said endless loop transversely forming a flat sheet having said single helical track now divided into a plurality of parallel tracks; scanning said information on each of said parallel tracks at substantially the same time; and recording said scanned information in a like plurality of parallel tracks at substantially the same time on a second flat sheet.

7. A method of rapidly duplicating a magnetic record of information comprising the steps of: providing a first sheet of material having recorded thereon a plurality of parallel tracks of information in a sequence such that when the ends of said first sheet are joined the end of each track coincides with the beginning of a successive track to provide a continuous helical track of information; scanning each of said plurality of tracks with a like plurality of scanning means to obtain data therefrom; and recording said data on a like plurality of parallel tracks on a second sheet of material.

8. A method of rapidly duplicating a magnetic record of information comprising the steps of: providing a first sheet of material having recorded thereon a plurality of parallel tracks of information in a sequence such that when the ends of said first sheet are joined the end of each track coincides with the beginning of a successive track to provide a continuous helical track of information; scanning each of said plurality of tracks substantially simultaneously with a like plurality of scanning means to obtain data therefrom; and recording said data as it is scanned on a like plurality of parallel tracks on a second sheet of material.

9. Apparatus for rapidly making a duplicate of a magnetic record having a continuous record of information divided into a plurality of parallel arranged component tracks presenting said information in sequence through said tracks comprising, in combination, two parallel beds for supporting the magnetic record and a magnetic recording medium, respectively, a carriage movable parallel to said beds, first and second sets of transducer heads carried by the carriage, said carriage supporting the first transducer heads in spaced apart relationship across the width of one bed for cooperation with the magnetic record thereon and supporting the second transducer heads in spaced apart relationship across the width of the other bed for cooperation with the magnetic recording medium thereon, a plurality of amplifiers each having an input and an output, leads connecting said first transducer heads to the inputs, respectively, of said amplifiers, further leads connecting said outputs of said amplifiers to said second transducer heads, respectively, and motor means for so driving said carriage backwards and forwards that said first transducer heads scan said magnetic record and said second transducer heads lay down parallel magnetic tracks corresponding to and duplicating said component tracks of the magnetic record.

10. Apparatus for rapidly making a duplicate of a magnetic record having a continuous record of information divided into a plurality of parallel arranged component tracks presenting said information in sequence through said tracks comprising, in combination, rotatable means for supporting said magnetic record in a loop and for moving said magnetic record around a looped path, a first set of transducer heads disposed in fixed position across said path for cooperation with said magnetic record, a linear bed for supporting a magnetic recording medium, a carriage movable parallel to said bed, a second set of transducer heads carried by the carriage in spaced apart relationship across the width of the bed for cooperation with said recording medium, a plurality of amplifiers each having an input and an output, leads connecting said first transducer heads to the inputs, respectively, of said amplifiers, further leads connecting said outputs of said amplifiers to said second transducer heads, respectively, and motor means for so driving said loop around said looped path and for so driving said carriage backwards and forwards that said first transducer heads scan said magnetic record and said second transducer heads lay down parallel magnetic tracks corresponding to and duplicating said component tracks of the magnetic record.

11. Apparatus for rapidly making a duplicate of a magnetic record having a continuous record of information divided into a plurality of parallel arranged component tracks presenting said information in sequence through said tracks comprising scanning means for scanning said tracks simultaneously, said scanning means comprising a plurality of transducer heads cooperating with said component tracks respectively, a second like plurality of transducer heads, coupling means for applying signals developed by the first said transducer heads to the second said transducer heads respectively, means for moving said second transducer heads and magnetic recording medium relative to one another so that said second transducer heads lay down parallel magnetic tracks corresponding to and duplicating said component tracks of the first said magnetic record respectively, and means responsive to cueing signals developed from said magnetic record to control the automatic operation of said apparatus.

12. A method of rapidly duplicating a magnetic record of information comprising the steps of: providing an endless loop having information recorded thereon in a continuous helical track; cutting said endless loop transversely forming a first flat sheet having said single helical track row divided into a plurality of parallel tracks; placing said first flat sheet and a second flat sheet on parallel beds, respectively; and moving a carriage carrying means for scanning said first sheet and means for recording on said second sheet along said beds to effect scanning said information on each of said parallel tracks and recording said scanned information in a like plurality of parallel tracks on said second flat sheet at substantially the same time.

References Cited in the file of this patent

UNITED STATES PATENTS

| | | |
|---|---|---|
| 2,109,627 | Finch | Mar. 1, 1938 |
| 2,604,549 | Begun | July 22, 1952 |
| 2,698,359 | Roberts | Dec. 28, 1954 |
| 2,768,049 | Geiser | Oct. 23, 1956 |
| 2,777,901 | Dostert | Jan. 15, 1957 |
| 2,797,101 | Daniels | June 25, 1957 |
| 2,976,372 | Sampson | Mar. 21, 1961 |
| 2,986,609 | Hoshino et al. | May 30, 1961 |